(12) United States Patent
Strudwicke et al.

(10) Patent No.: US 12,345,614 B2
(45) Date of Patent: Jul. 1, 2025

(54) SENSING SYSTEM

(71) Applicant: Weir Group IP Limited, Strathclyde (GB)

(72) Inventors: Craig Strudwicke, Molong (AU); Christopher Haig, Portland, OR (US); Jason Betournay, Portland, OR (US); Mahesh Gulavani, Bangalore (IN)

(73) Assignee: Weir Group IP Limited, Glasgow (GB)

( * ) Notice: Subject to any disclaimer, the term of this patent is extended or adjusted under 35 U.S.C. 154(b) by 310 days.

(21) Appl. No.: 17/626,246

(22) PCT Filed: Jul. 17, 2020

(86) PCT No.: PCT/IB2020/056748
§ 371 (c)(1),
(2) Date: Jan. 11, 2022

(87) PCT Pub. No.: WO2021/014310
PCT Pub. Date: Jan. 28, 2021

(65) Prior Publication Data
US 2022/0252485 A1 Aug. 11, 2022

(30) Foreign Application Priority Data

Jul. 25, 2019 (GB) ..................... 1910615

(51) Int. Cl.
*G01M 99/00* (2011.01)
*H04Q 9/00* (2006.01)
(52) U.S. Cl.
CPC ............ *G01M 99/005* (2013.01); *H04Q 9/00* (2013.01); *H04Q 2209/20* (2013.01); *H04Q 2209/40* (2013.01)

(58) Field of Classification Search
CPC ... G01M 99/005; H04Q 9/00; H04Q 2209/20; H04Q 2209/40; G01D 21/00; G01D 11/24; G01D 21/02
See application file for complete search history.

(56) References Cited

U.S. PATENT DOCUMENTS 5,821,405 A    10/1998  Dickey et al.
10,097,370 B2 * 10/2018  Reil .................. G05B 19/0426
(Continued)

FOREIGN PATENT DOCUMENTS

CA       2155249 C  *  6/2006  ............. B03B 5/623
CN     105451310 A  *  3/2016
(Continued)

*Primary Examiner* — Eyob Hagos
(74) *Attorney, Agent, or Firm* — MORRISS O'BRYANT COMPAGNI CANNON, PLLC

(57) ABSTRACT

A sensing system for sensing operational parameters of equipment is described. The sensing system comprises: a plurality of intelligent mounting points, a plurality of sensors, each coupled to a respective mounting point, and a data harvester coupled to the plurality of sensors. Each intelligent mounting point is located at a position on the equipment at which a measurement is to be recorded, and includes at least one equipment identification parameter and at least one sensing point parameter. The data harvester comprises: (i) a wireless transceiver for communicating with the plurality of sensors and a portable device, (ii) a network connection for communicating with a local computer coupled to a distributed control system, (iii) a memory for storing data captured by the sensors, and (iv) a processor operable to control the operation of the data harvester.

15 Claims, 5 Drawing Sheets

(56) References Cited

U.S. PATENT DOCUMENTS

| | | | |
|---|---|---|---|
| 2009/0061863 A1* | 3/2009 | Huggett | H04L 63/101 |
| | | | 455/434 |
| 2010/0145479 A1* | 6/2010 | Griffiths | H04L 67/12 |
| | | | 700/17 |
| 2014/0028462 A1* | 1/2014 | Lawson | H04Q 9/00 |
| | | | 340/870.01 |
| 2014/0122864 A1* | 5/2014 | Baxi | G06F 13/385 |
| | | | 713/100 |
| 2016/0343241 A1* | 11/2016 | Rossi | G08B 29/126 |
| 2017/0302741 A1* | 10/2017 | Conner | G08B 25/08 |
| 2018/0120132 A1* | 5/2018 | Tanutama | G01D 21/00 |
| 2018/0217958 A1* | 8/2018 | Fan | H02J 5/00 |
| 2019/0068184 A1* | 2/2019 | Fink | G08C 19/22 |
| 2019/0176167 A1* | 6/2019 | Buttler | B04C 5/24 |
| 2021/0029298 A1* | 1/2021 | Mysore | G06V 20/52 |

FOREIGN PATENT DOCUMENTS

| | | | | |
|---|---|---|---|---|
| EP | 2138919 A1 | 12/2009 | | |
| JP | 3209536 B2 * | 9/2001 | | G01D 21/02 |
| WO | WO-2017197449 A1 * | 11/2017 | | G05B 11/01 |
| WO | 2017221001 A1 | 12/2017 | | |

* cited by examiner

SENSOR 16 ELECTRONICS

DATA HARVESTER 18

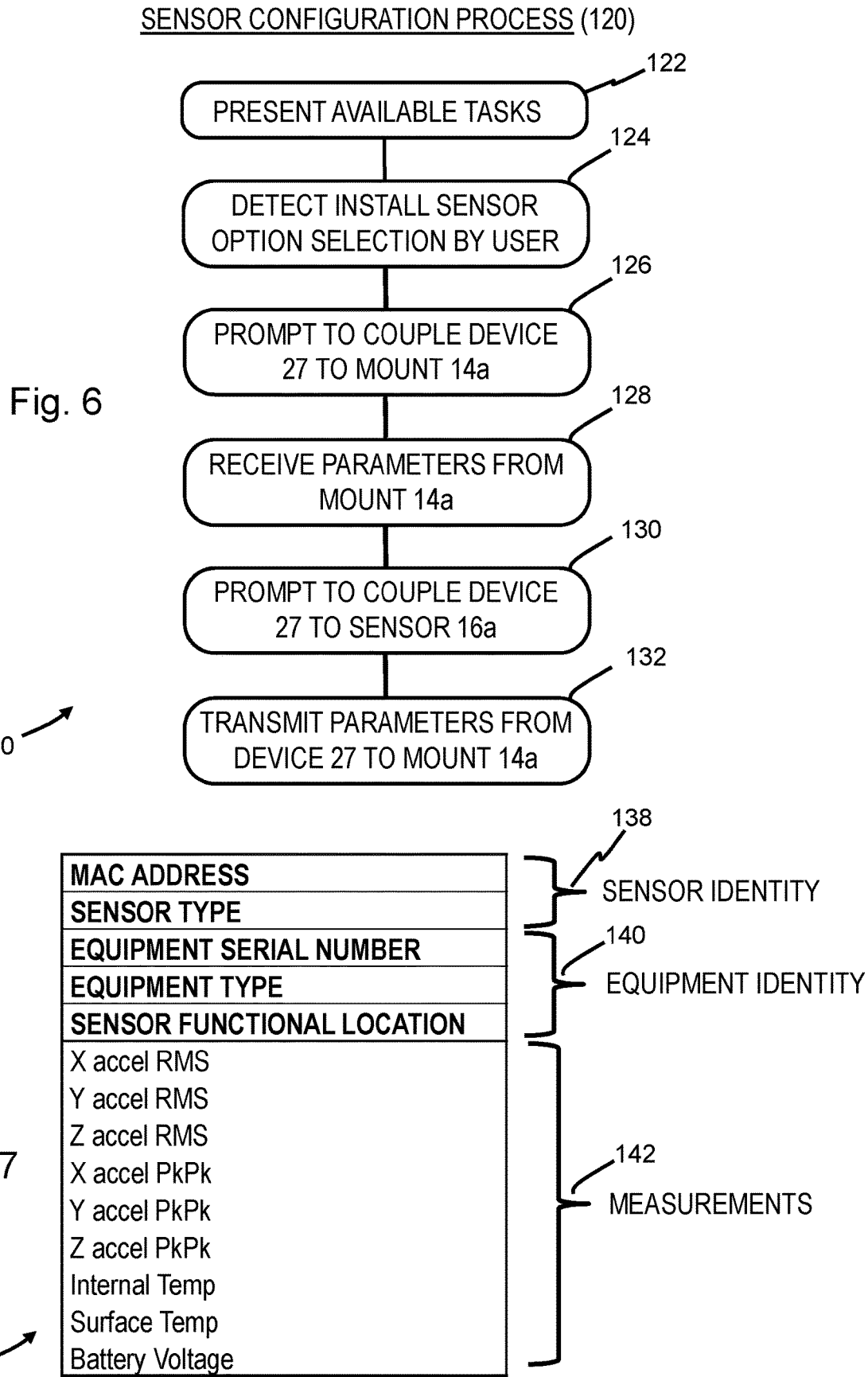

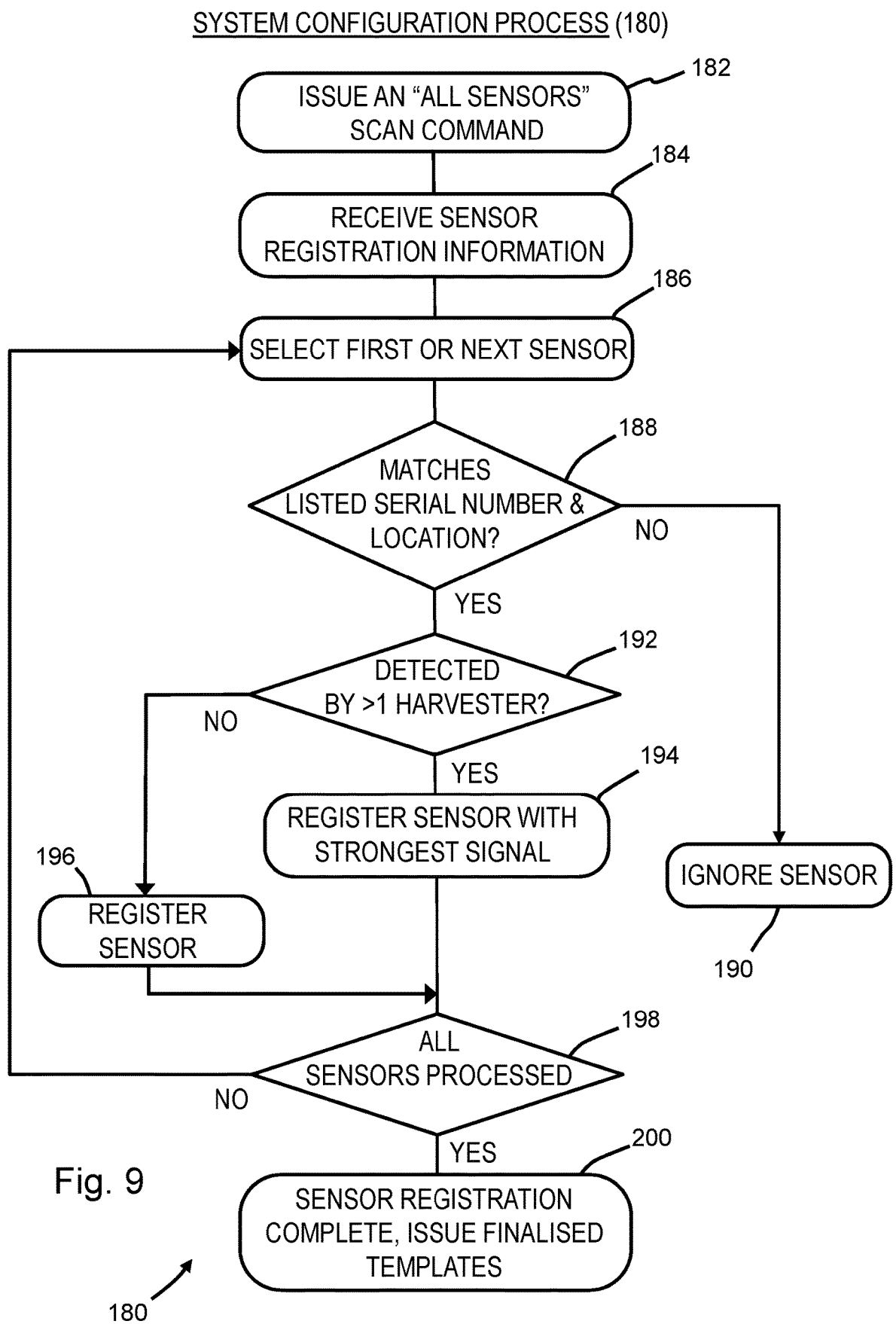

SENSING SYSTEM

The invention relates to improvements in or relating to a sensing system and parts thereof, and particularly, but not exclusively, to a sensor system for use with industrial equipment, such as mining and mineral processing equipment.

Mining and mineral processing equipment operates in harsh environments and is typically subject to severe slurry erosion wear by particles being processed, which may be suspended in a liquid (referred to as a slurry). Some mining and mineral processing equipment, such as vibrating screens, also experience very high vibrational forces that can adversely affect their operation.

It is important therefore to collect data indicating how such equipment is working, and to process such data to improve performance or reliability of such equipment.

Capturing data can be challenging due to the conditions in which the equipment operates. Transmitting that data to a remote location for further processing can also be challenging because mine sites are typically located in remote regions, and obtaining reliable internet access in such remote regions is difficult or expensive.

It is among the objects of an embodiment of the present invention to provide an improved sensing system that mitigates one or more of the above disadvantages or other advantages associated with prior art sensing systems, or to provide a useful alternative to such systems.

According to a first aspect there is provided a sensing system for sensing operational parameters of equipment, the sensing system comprising: (i) a plurality of intelligent mounting points, each intelligent mounting point: (a) being located at a position on the equipment at which a measurement is to be recorded, (b) defining a mounting zone into which a sensor may be coupled, and (c) including at least one equipment identification parameter and at least one sensing point parameter; (ii) a plurality of sensors, each sensor comprising: (a) a coupling zone operable to be mounted on the mounting zone of each of the intelligent mounting points, (b) an accelerometer for measuring vibrations, (c) a thermometer for measuring temperature, (d) a memory for storing data captured by the sensor, (e) a wireless transceiver, and (f) a processor operable to control the operation of the sensor; and (iii) a data harvester comprising (a) a wireless transceiver for communicating with the plurality of sensors and a portable device, (b) a network connection for communicating with a local computer, (c) a memory for storing data captured by the sensors, and (d) a controller operable to control the operation of the data harvester.

The network connection may be wireless, but in some applications a wired connection may be preferred.

The local computer may be part of the sensing system and it may be coupled to a distributed control system (DCS), and operable to merge data from the DCS (or from programmable logic controllers (PLCs) on other equipment on the same or a nearby mine site) with data received from the sensors via the data harvester, and to transmit the merged data to a cloud computing environment for further processing.

The local computer may be directly connected to additional sensors, for example, via cables or in a wireless manner.

Each sensor may be operable in a plurality of modes. A first mode may comprise the processor controlling the sensor to receive captured data (raw data) then process the raw data to create processed data. The processor may then transmit the processed data to the data harvester via the wireless transceiver. The first mode may only require a low data rate of transmission. A second mode may comprise the processor controlling the sensor to receive captured data (raw data) then transmit the raw data to the data harvester via the wireless transceiver (i.e. without any processing, or with less processing than for the first mode). The second mode may require a higher data rate of transmission than the first mode, and it may consume more power in the sensor. A third mode may comprise a sleep mode in which the sensor consumes little or no power and makes few or no measurements.

The at least one equipment identification parameter may comprise one or more of: (i) a serial number of the equipment, (ii) a part number of the equipment, and (iii) a descriptive name for the equipment (e.g. cyclone, centrifugal pump, vibrating screen). Equipment identification parameters would be common to all mounting points on that piece of equipment.

The at least one sensing point parameter may comprise one or more of: (i) an identification of the part of the equipment at which a measurement is being recorded, (ii) an indication of a sensing mode to be used by a corresponding sensor mounted thereto, (iii) an indication of a reporting or logging period (e.g. a time after which stored data is to be transmitted), (iv) an indication of capture parameters to be used, and (v) an indication of a processing operation to be performed on raw data prior to the sensor transmitting the processed data to the data harvester. For example, the indication of capture parameters to be used may include a capture frequency range for hydrocyclones (for example 10 to 30 Hz, 20 to 50 Hz, 1 to 3 kHz or the like), a vibration range for vibrating screens (for example, above 15 g RMS). The indication of a processing operation to be performed on raw data may include a sample rate to be applied to the captured data (either raw data, or data that has already had some processing performed on it).

The identification of the part of the equipment at which a measurement is being recorded is typically unique for each mounting point on the equipment.

Examples of an identification of the part of the equipment at which a measurement is being recorded are as follows. For a vibrating screen: upper screen deck, bridge, exciter, sidewalls, or the like. For a pump: cutwater, pump casing, impeller, or the like. For a cyclone: vortex finder, spigot, separation chamber; or the like. Each such identification may comprise a code selected from a list of codes mapped to corresponding identifiers or parameters.

The parameters may be stored in a mounting point memory.

Each intelligent mounting point may include a wireless transceiver, such as a Bluetooth (trade mark) low energy wireless transceiver (also referred to as a BLE transceiver or a Bluetooth beacon)

The sensor wireless transceiver may also comprise a BLE transceiver.

The data harvester is preferably coupled to at least four sensors; although it can be used with fewer sensors.

The data harvester may receive power via the wired network connection (that is, it may use, for example, an Ethernet (trade mark) network, and may use Power over Ethernet).

The data harvester may be programmable to switch a sensor from the first mode to the second mode for a defined time, then to switch the sensor back to the first mode. This has the advantage that a large amount of data can be captured at a time when the data is considered to be highly useful without unduly draining a battery power supply in the sensor.

The data harvester may be optimised to process wireless transceiver data from the sensors.

A distributed control system (DCS) is typically a computerised control system for a process or plant usually having a large number of control loops, in which autonomous controllers are distributed throughout the system, but there is typically a central operator supervisory control.

The sensing system may further comprise a portable communications device, such as a mobile phone (cellular radiofrequency telephone) or a tablet. The portable communications device may include a wireless transceiver and may include software (such as an app) for configuring the sensors via the wireless transceiver. Such configuration may include updating the operating mode of the sensors for a short or extended period. It is anticipated that the second mode would only be used for relatively short time periods (several minutes) due to the high data rate and power consumption.

In some embodiments, each sensor may receive power from the intelligent mounting point to replace, recharge, or supplement battery power in the sensor.

According to a second aspect there is provided a method of sensing operational parameters of equipment, the method comprising: providing a plurality of intelligent mounting points, each intelligent mounting point being located at a position on the equipment at which a measurement is to be recorded and including at least one equipment identification parameter and at least one sensing point parameter; providing a plurality of sensors, each sensor being coupled to a respective intelligent mounting point; transmitting the at least one equipment identification parameter and the at least one sensing point parameter from each intelligent mounting point to each respective sensor; configuring the sensor with operational parameters based on the transmitted sensing point parameters; and wirelessly transmitting captured sensor data to the data harvester.

Transmitting the equipment identification and sensing point parameters from each intelligent mounting point to each respective sensor may be implemented by direct communication between the intelligent mounting point and the respective sensor, or via an intermediate device, such as a mobile device carried by a human operator.

The method may further comprise switching the sensor temporarily from a first mode of operation with a low data transmission rate to a second mode of operation with a high data transmission rate, based on a signal received wirelessly from a data harvester;

The method may further comprise transmitting the captured sensor data from the data harvester to a local computer using a wired connection.

The method may further comprise merging, at the local computer, data received from a distributed control system with the captured data, and transmitting the merged data to a remote networked computer for further processing and analysis.

By virtue of some aspects, a data harvester is provided that is dedicated for high data rate transmission of sensor data, and the sensors can operate on battery power for an extended period by transmitting at a relatively low data rate, and for short periods at a relatively high data rate. This enables large amounts of data to be captured at particular times of interest without unduly draining sensor batter power.

According to a third aspect there is provided mineral processing equipment including a sensing system according to the first aspect or operating according to the second aspect.

The mineral processing equipment may comprise a centrifugal pump, a hydrocyclone, a vibrating screen, a high pressure grinding roll (or other crusher), a positive displacement pump, a valve, or the like.

According to a fourth aspect there is provided a data harvester for use with sensors mounted on industrial equipment, the data harvester comprising: (a) a wireless transceiver for communicating with the plurality of sensors and a portable device; (b) a network connection for communicating with a local computer; (c) a memory for storing data captured by the sensors; and (d) a controller operable to: (i) receive a list of authorised sensor locations on the equipment, (ii) receive signals from the plurality of sensors, where the signals include the location of each sensor, (iii) register those sensors corresponding to the authorised sensor locations, (iv) create a provisional template comprising those registered sensors, and (v) transmit the provisional template to the local computer.

The sensors may be mounted on mineral processing equipment.

The network connection may be a wired network connection (such as an Ethernet connection) or a wireless network connection.

The controller may be further operable to switch selectively one or more of the sensors between a plurality of modes of operation.

The controller may be further operable to send a heartbeat signal to the local computer once every defined time period.

The controller may be further operable to receive a finalised template from the local computer and to de-register any sensors listed on the provisional template that are not listed on the finalised template.

The controller may be further operable to request from the local computer a list of all finalised templates for data harvesters coupled to the local computer, and to provide the list to a mobile device application.

The local computer may be coupled to a distributed control system.

According to a fifth aspect there is provided a method of performing the steps implemented by the controller in the fourth aspect.

According to a sixth aspect there is provided a method of configuring industrial equipment including a plurality of intelligent mounting points, each intelligent mounting point being located at a position on the equipment at which a measurement is to be recorded, and storing therein at least one equipment identification parameter and at least one sensing point parameter, the method comprising: (i) providing a plurality of sensors, each sensor being coupled to a respective intelligent mounting point; (ii) configuring each of the plurality of coupled sensors with the equipment identification parameter from its corresponding intelligent mounting point; and (iii) configuring each of the plurality of coupled sensors with operational parameters from its corresponding intelligent mounting point, where the operational parameters are for use in capturing data from the industrial equipment at that intelligent mounting point.

These and other aspects of the present invention will become apparent from the following specific description, given by way of example only, with reference to the accompanying drawings, in which:

FIG. 6 is a flowchart illustrating steps performed to configure one of the sensors in the sensing system of FIG. 1;

FIG. 7 is a simplified schematic diagram illustrating a packet of information transmitted from a sensor to the data harvester in the system of FIG. 1;

FIG. 9 is a flowchart illustrating steps performed by the ruggedized computer in configuring the system of FIG. 1.

Figure 1:
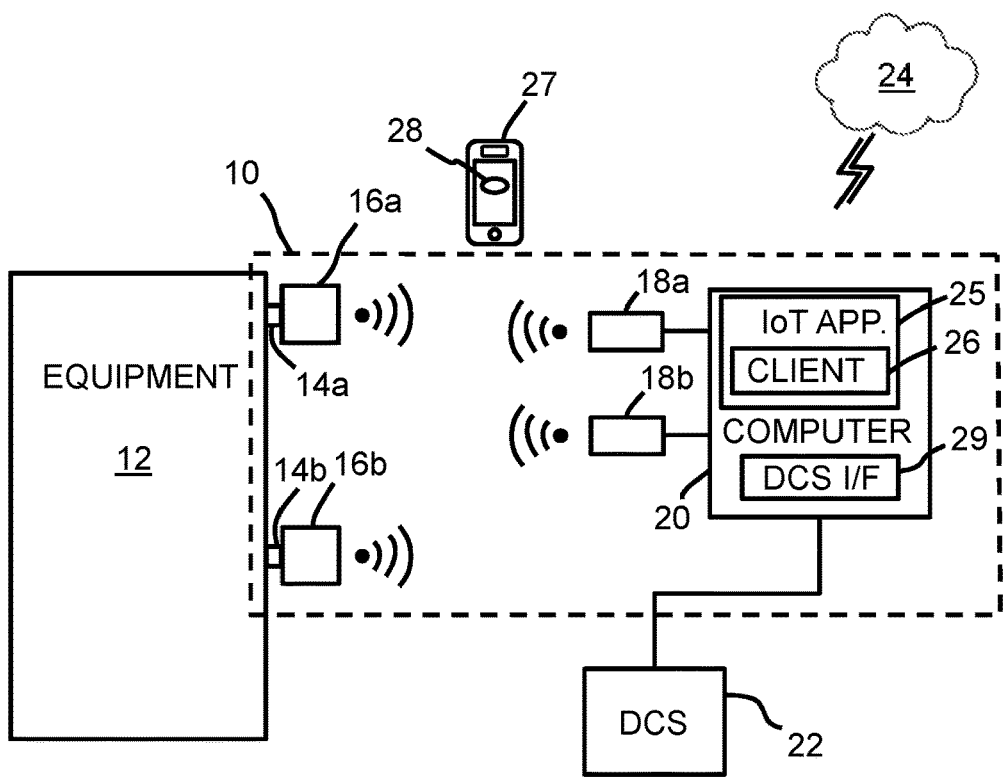
FIG. 1 is a simplified schematic diagram of a sensing system according to a first embodiment of the present invention, where the system includes a ruggedized computer coupled to data harvesters that are connected to sensors coupled to intelligent mounting points on equipment.

Reference is first made to FIG. 1, which is a simplified schematic drawing of a sensing system 10 according to one embodiment of the present invention. The sensing system 10 (shown in broken line in FIG. 1) is coupled to equipment 12 in the form of mineral processing equipment. In this embodiment, the mineral processing equipment 12 comprises a centrifugal pump, but in other embodiments such equipment 12 may comprise a hydrocyclone, a vibrating screen, a valve, or the like.

The sensing system 10 comprises: a plurality of intelligent mounting points 14a,b (only two of which are shown in FIG. 1); a plurality of sensors 16a,b, each sensor 16a,b being coupled to a respective mounting point 14a,b; a plurality of data harvesters 18a,b in wireless communication with each of the sensors 16a,b, and a ruggedized computer 20. Although a plurality of data harvesters 18 are used in this embodiment, in other embodiments, only one data harvester 18 may be provided.

The ruggedized computer 20 is in communication with a distributed control system (DCS) 22 to provide operation information thereto and to receive information therefrom relating to other equipment on a mine site on which the centrifugal pump 12 is located.

The ruggedized computer 20 is also in communication with a remote cloud computing environment 24, which provides additional storage, processing and analytic functions on data transmitted thereto by the computer 20.

The ruggedized computer 20 includes an Internet of Things (IoT) application 25 to collect, manage, pre-process, analyse, process, and forward (as appropriate) information captured from the sensors 16a,b to the DCS 22 or the remote cloud computing environment 24. This IoT application 25 includes a data harvester client 26 to interface with the data harvesters 18a,b. The IoT application 26 is able to transform data from the sensors 16, and other data feeds, into information about the equipment 12.

The computer 20 is ruggedized in the sense that it is suitable for mounting in an outdoor, industrial environment, such as a mine site.

A mobile device 27 (which may be a conventional mobile telephone or a tablet) is shown in proximity to one of the sensors 16a. The mobile device 27 includes a BLE transceiver (not shown), and, optionally, an NFC transceiver (not shown). From a software perspective, the mobile device 27 executes a conventional operating system (not shown) and a sensor system application (app) (illustrated schematically as ellipse 28 in FIG. 1) for communicating directly with the intelligent mounting points 14, the sensors 16, the ruggedized computer 20, and the remote cloud computing environment 24.

Each intelligent mounting point 14 is located at a different position on the centrifugal pump 12. These positions correspond to areas of interest of the centrifugal pump 12 at which data is to be collected. In this example, one intelligent mounting point 14a is located in a bearing that supports a shaft of the pump 12; another intelligent mounting point 14b is located near a cutwater in the volute of the pump 12. In other embodiments an intelligent mounting point may be located at a seal of the pump 12 to measure a pressure therein, or outside the seal to measure fluid loss therefrom. Each intelligent mounting point 14 defines a mounting zone into which a respective sensor 16 may be physically coupled and securely held.

The ruggedized computer 20 also includes a conventional server component 29 for communicating with the DCS 22.

In this embodiment the data harvester client 26 is responsible for communicating with the data harvesters 18, including monitoring their presence or absence, and pushing firmware updates thereto.

In this embodiment the server component 29 is an Open Platform Communications (OPC) Unified Architecture (UA) server that communicates with a Supervisory Control and Data Acquisition (SCADA) system used in many DCS platforms.

Figure 2:
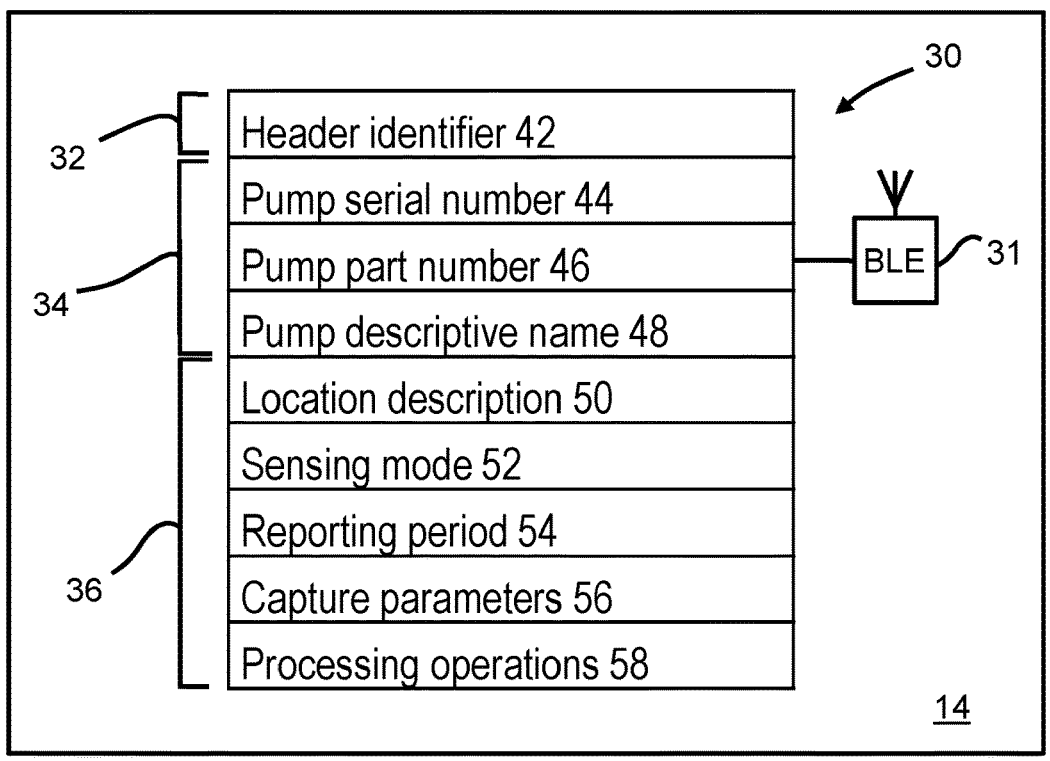
FIG. 2 is a simplified schematic diagram illustrating in more detail parts (electronic components) of one of the components (the intelligent mounting point) of the system of FIG. 1.

Reference is now made to FIG. 2, which is a simplified schematic diagram illustrating electronic components of the intelligent mounting point 14 in more detail. These electronic components include a memory 30 and a BLE transceiver 31 for communicating information to and from the memory 30. The memory 30 stores information about: the pump 12, the mounting point 14, data capture parameters, and data processing.

The mounting point memory 30 is programmed with three categories of fields: a header category 32, an equipment identification category 34, and a sensing point category 36.

The header category 32 contains header type information 42 used for establishing wireless communication with other devices, such as the sensor 16 or the mobile device 27.

The equipment identification category 34 comprises: an equipment (in this embodiment a pump) serial number field 44 including one or more parameters identifying the unique serial number of that equipment (the pump) 12; an equipment (pump) part number 46 including one or more parameters, for example, from an enterprise resource planning (ERP) system (not shown) of the manufacturer of the equipment (pump) 12; and a descriptive name field 48, including one or more parameters identifying the equipment type, in this embodiment, parameters comprise the text "Centrifugal pump".

The sensing point category 36 comprises a location description field 50 including one or more parameters identifying where on the pump 12 the intelligent mounting point 14 is located. The manufacturer of the pump 12 or the supplier of the sensing system 10 (if different) may have a mapping of unique identifiers to specific locations on each type of equipment so that each unique identifier can be mapped to a specific location on a specific type of equipment.

The sensing point category 36 also comprises: a sensing mode field 52; a reporting period field 54; a capture parameters field 56; and processing operations field 58.

The sensing mode field 52 includes one or more parameters providing an indication of a sensing mode to be used by a corresponding sensor 16 mounted thereto. In this embodiment there are two modes. The first mode is a low data rate mode in which the sensor 16 samples data, processes the sampled data, and transmits the processed, sampled data. The second mode is a high data rate mode in which the sensor 16 transfers raw data as it is captured.

The reporting period field 54 indicates the length of sample time that should be used when the sensor 16 is operating in the low data rate mode for that position and type of sensor, for example, the sample time may be 30 seconds (one reading is taken for every thirty seconds that elapses). Data is collected by the sensor 16 at this sample time then transmitted to the data harvester 18 with which that sensor 16 is registered (described in more detail below). In some embodiments, data may be averaged, or otherwise aggregated, over this sample time, and then a single reading sent to the data harvester 18 corresponding to the sample time. The reporting period field 54 may comprise different lengths of sample time for different types of measurement taken by the sensor 16, for example, temperature readings may be taken at a different time period to vibrational measurements, even though the same sensor 16 takes both measurements.

The capture parameters field 56 provides the data capture parameters that are to be used by the sensor 16. For example, the vibration response may be provided as a range, such as 10 g to 16 g RMS; the frequency response may be provided as a range, for example, 10 to 50 Hz, 200 to 500 Hz, or the like.

The processing operations field 58 includes one or more parameters that provide an indication of a processing operation to be performed on captured data prior to the sensor 16 transmitting the processed data to the data harvester 18. For example, the parameters may indicate that captured data is to be interpolated or averaged over a defined number of sample points.

Figure 3:
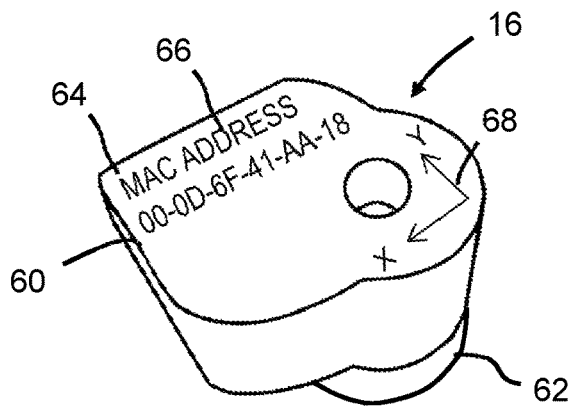
FIG. 3 is a pictorial view illustrating in more detail another of the components (the sensor) of the system of FIG. 1.

Reference is now made to FIG. 3, which is a pictorial view of the sensor 16. The sensor 16 comprises a housing 60 defining a coupling zone 62 at a lower end thereof and a flat surface 64 at an upper end thereof. The coupling zone 62 is a physical coupling that engages with a complementary coupling (not shown) on the intelligent mounting point 14. In this embodiment, the physical coupling includes a quarter turn fitting. Each sensor 16a,b can be mounted on each intelligent mounting point 14a,b.

The upper surface 64 includes network adapter information 66 (in the form of a MAC address) and orientation information 68 printed, embossed, engraved, or otherwise delineated thereon so that it can be read by a human operator. The MAC (Media Access Control) address is a unique address of a network device within the sensor 16.

Figure 4:
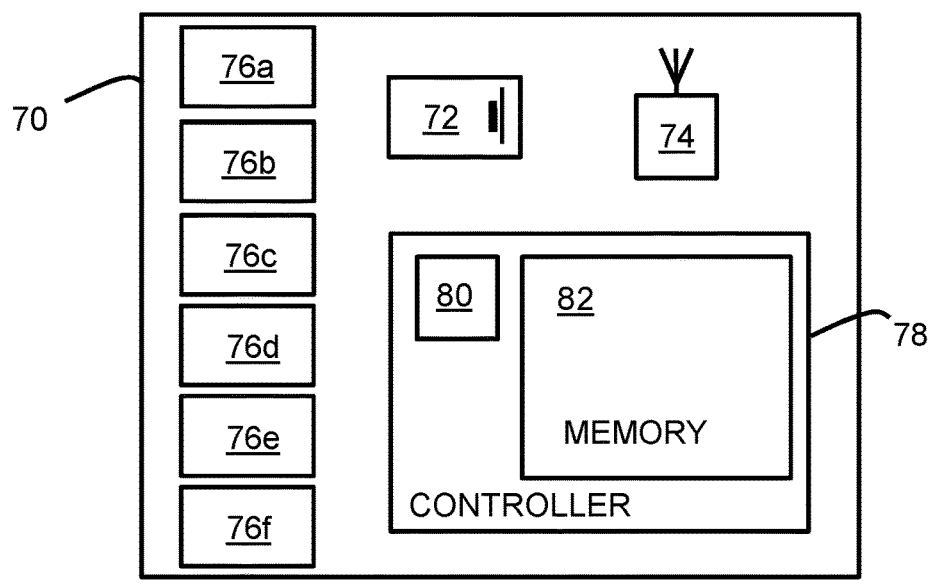
FIG. 4 is a simplified schematic diagram illustrating in more detail internal parts (electronic components) of the sensor of FIG. 3.

Reference is now made to FIG. 4, which is a simplified schematic diagram illustrating electronic components within the sensor 16. The sensor 16 comprises a circuit board 70 on which the components are mounted. The components include: a power source 72 (in the form of a battery), a wireless transceiver 74, in the form of a Bluetooth (trade mark) Low Energy (BLE) transceiver, a plurality of sensor nodes 76, and a controller 78 for controlling the operation of the sensor 16.

The sensor nodes 76 include: a triaxial MEMS (Micro-Electro-Mechanical Systems) accelerometer 76a for measuring vibrations, a temperature sensing node 76b for measuring temperatures internal to, and external of, the sensor housing 60, a battery charge sensing node 76c, a transceiver (BLE) sensing node 76d, and a pair of Hall Effect sensors 76e,f.

The controller 78 includes a microprocessor 80 and an associated memory 82 for storing data read from the pump 12 and for storing configuration parameters and sensor device settings (such as the MAC address, and the sensor type (vibration and temperature)).

Figure 5:
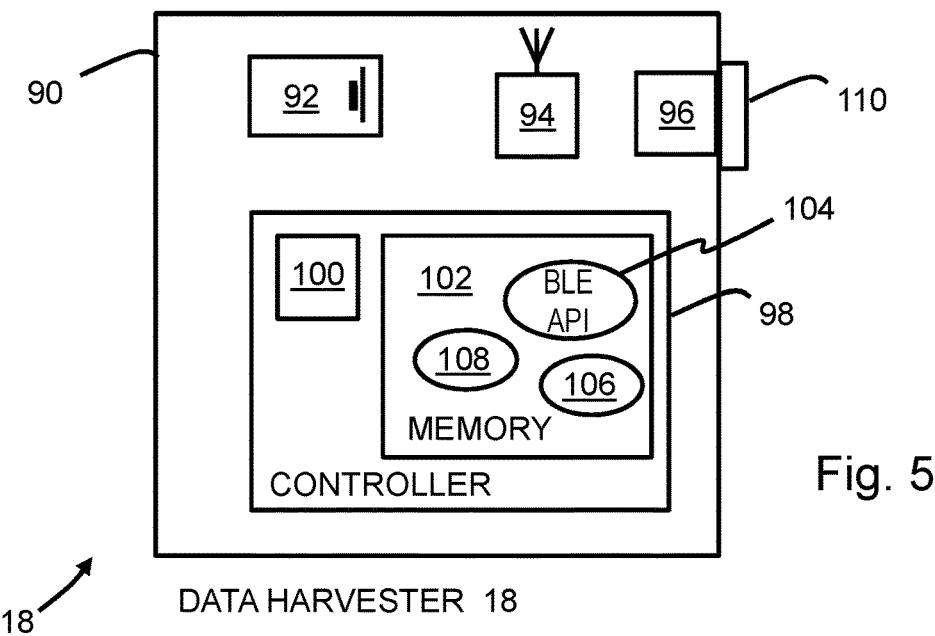
FIG. 5 is a simplified schematic diagram illustrating in more detail components of the data harvester of the system of FIG. 1.

Reference is now made to FIG. 5, which is a simplified schematic diagram illustrating electronic components within the data harvesters 18. The data harvesters 18 (also referred to as a BLE Base Stations) comprise a circuit board 90 on which the components are mounted. The components include: a power source 92 (as a fall-back in case the main power supply is lost), a wireless transceiver 94, in the form of a Bluetooth Low Energy (BLE) transceiver, a wired network connection 96 in the form of a Power over Ethernet transceiver, and a controller 98 operable to control the operation of the data harvester 18.

The controller 98 includes a microprocessor 100 and an associated memory 102 for storing data read from the sensors 16, configuration parameters, device settings, and sensor firmware updates. The memory 102 includes a sensor transceiver API 104 (also referred to as a sensor BLE API), a client interface 106, and data harvester firmware 108. The sensor BLE API 104 can be used with all of the sensors 16. The client interface 106 communicates with the data harvester client 26 and provides a periodic heartbeat signal thereto. In this embodiment, the heartbeat signal is transmitted every minute, although in other embodiments, the heartbeat may be transmitted every ten seconds, twenty seconds, thirty seconds, or any other convenient time interval. The client interface 106 also receives firmware updates from the data harvester client 26 and the microprocessor 100 updates the stored data harvester firmware 108 therewith.

The Ethernet transceiver 96 has an associated Ethernet connector port 110 on an external surface of the data harvester 18.

The Ethernet transceiver 96 is connected to the ruggedized computer 20, which provides power to the data harvester 18 via the Ethernet transceiver (Power over Ethernet).

Firmware updates are preferably provided from the ruggedized computer 20 by the Ethernet transceiver 96 because of the high transmission bandwidth provided by the Ethernet connection. However, it is possible that firmware updates may be provided by the mobile device 27 via app 28.

Reference will now be made to FIG. 6, which is a flowchart 120 illustrating steps performed to configure one of the sensors 16a in the sensing system 10 (the sensor configuration process). This process may be performed when an engineer or installation technician couples each sensor 16 to its associated intelligent mounting point 14.

The engineer or installation technician (an operator) selects the app 28 on the mobile device 27, which the mobile device 27 launches, and then presents a list of available tasks (step 122), one of which is a sensor installation and configuration option. The operator then selects this configuration option, which the app 28 detects (step 124) and implements by prompting the operator to place the mobile device 27 in proximity to the intelligent mounting point 14a into which the sensor 16a is coupled (step 126). The mobile device app 28 then receives the parameters stored in the header category 32, the equipment identification category 34, and the sensing point category 36 (step 128) via the intelligent mounting point BLE transceiver 31.

The mobile device app 28 then prompts the operator to couple the sensor 16a to the intelligent mounting point 14a (if the operator has not already done this) and to place the mobile device 27 in proximity to the sensor 16a, now coupled to the intelligent mounting point 14a (step 130). The mobile device app 28 then transmits the parameters retrieved from the intelligent mounting point 14a to the sensor 16a (step 132), that is, those parameters retrieved in step 128. This is implemented by a BLE transceiver in the mobile device 27 and the sensor BLE transceiver 74. The mobile device app 28 may also transmit to the data harvester 18 details of the sensor 16a and mounting point 14a that have been coupled and configured.

The sensor 16a then configures itself based on the received parameters, which means that the sensor 16a is now provided with information about the pump 12, the mounting point 14a location on the pump 12, which measurements to take at that location, the sample time used for those measurements, and the frequency with which the measurements are to be transmitted to the data harvester 18. The default operating mode of the sensor 16a is the first mode, which is the low data transmission rate mode.

Thus, the mobile device app 28 is used to program the sensor 16a with information stored by the intelligent mounting point 14a so that the sensor 16a is configured for the specific measurements that are best suited to that part of the equipment 12 at which the intelligent mounting point 14a is located. This enables generic sensors 16 to be provided and configured at the time they are coupled to the equipment 12. It also allows a sensor 16a to be removed and used at another location, where it can be configured to take different measurements.

The operator can monitor the data transmitted from the sensor 16a to the associated data harvester 18a using the app 28 on the device 27. Either the app 28 on the device 27 or the data harvester 18 can switch the sensor 16a to the second (high data rate) mode for a short period of time.

Both the app 28 and the data harvester 18 receive information from the sensor 16a about the status of the battery 72 and the BLE transceiver 74 so that they can monitor the state of health of the sensor 16a.

The data harvester 18 monitors its registered sensors (for example, sensor 16a) by using the sensor transceiver API 104 to extract the sensor information from the sensor transmissions. Registration of the sensor 16a with one of the data harvesters 18 is described in more detail below.

Reference will now be made to FIG. 7, which is a simplified schematic diagram illustrating a packet of information 136, which is transmitted from the sensor 16a to the data harvester 18a in the sensing system 10.

The information packet 136 includes sensor identity information 138 for that sensor 16a (such as its MAC address, the type of sensor, and the like); equipment identity information 140 for the pump 12 (which may include the parameters retrieved from the equipment identification category 34 in the intelligent mounting point 14a); and measurement information 142 from the sensor nodes 76 in the sensor 16a. The measurement information 142 may include both root mean squared (RMS) and peak to peak (PkPk) values of acceleration in three orthogonal directions (x, y, z).

To configure the sensing system 10, the sensors 16 should be registered with the data harvesters 18 and also with the ruggedized computer 20.

To register the sensors 16 with the data harvesters 18, the sensor transceiver API (BLE API) 104 implements a sensor registration process, which will be described with reference to FIG. 8, which is a flowchart 150 showing the steps involved in implementing a data harvester configuration process. Flowchart 150 is from the perspective of one data harvester 18a; each data harvester 18 would implement a similar sensor registration process.

Initially, the BLE API 104 receives an information packet 136 from a sensor 16 (step 152) and parses the packet 136 (step 154) to ascertain if the MAC address from the sensor 16 corresponds to a MAC address that is already registered with the data harvester 18a (step 156).

If the MAC address is not already registered, then the BLE API 104 ascertains if the sensor identity is valid (it is a known type of sensor) and that the sensor location on the pump 12 is available for a new sensor (step 158). If either of these is not correct then the packet is ignored (step 160).

If both of these are correct (sensor 16 is valid and the location is available for a sensor) then the BLE API 104 assigns the sensor 16 to a provisional register of installed sensors for that pump 12 (also referred to as a template) (step 162).

If, at step 156, the MAC address is already registered, then the BLE API 104 proceeds directly to step 164 to extract the measurement information 142 because the sensor 16 is already registered with the data harvester 18a.

Once a sensor 16 is registered, information packets 136 transmitted by that sensor 16 can be processed by the data harvester controller 98. Processing packet information typically involves the BLE API 104 extracting measurement information 142 for analysis, processing, and onward transmission to the ruggedized computer 20. The BLE API 104 also saves the measurement information 142 in local memory 102 or non-volatile storage (not shown); although in some embodiments older measurement information 142 may be overwritten by new measurement information 142 in local memory 102 when the local memory 102 becomes full (for example, in accordance with a storage protocol).

The BLE API 104 repeats this sensor registration process for all received information packets 136 until a final template is received from the ruggedized computer 20, as will be described in more detail below. The final template for each data harvester 18 is received once the IoT app 25 (FIG. 1) has completed the system configuration.

To start the system configuration, the IoT app 25 (FIG. 1) requests and then receives and stores installation information from the remote cloud computing environment 24. This installation information includes the items of equipment 12 being monitored at that location (for example, that mine site). The items of equipment 12 may include, for example, a pump, a set of hydrocyclones, an ore crusher, a vibrating screen, and the like. This installation information also includes serial numbers for the items of equipment 12, the types of sensing devices that are being used on each one of those items of equipment 12 (e.g. a pressure sensor, a temperature sensor, an accelerometer may be used on the pump; a temperature sensor and an accelerometer may be used on the vibrating screen, etc.), and the locations of those sensing devices on each one of those items of equipment 12 (e.g. a pressure sensor at a cutwater of the pump).

This installation information may be referred to as an Equipment Whitelist because it lists the equipment 12 that has been approved for receiving sensors 16 and providing information to the ruggedized computer 20.

This installation information (Equipment Whitelist) can be provided prior to any person being on site to install the relevant sensors 16 to the equipment 12.

Reference will now be made to FIG. 9, which is a flowchart 180 showing the steps implemented by the ruggedized computer 20 (using the IoT application 25) in configuring the system 10 (the system configuration process 180).

Initially, the data harvester client application 26 issues a command to each of the connected data harvesters 18a,b to transmit a list of sensors 16 registered with that data harvester 18a,b (step 182). Although only two data harvesters 18a,b are shown in FIG. 1, more or less than two data harvesters 18 may be coupled simultaneously to one ruggedized computer 20. The sensors registered with a data harvester 18a are those listed on the provisional template created by the data harvester configuration process 150 (FIG. 8) for that data harvester 18a.

Figure 8:
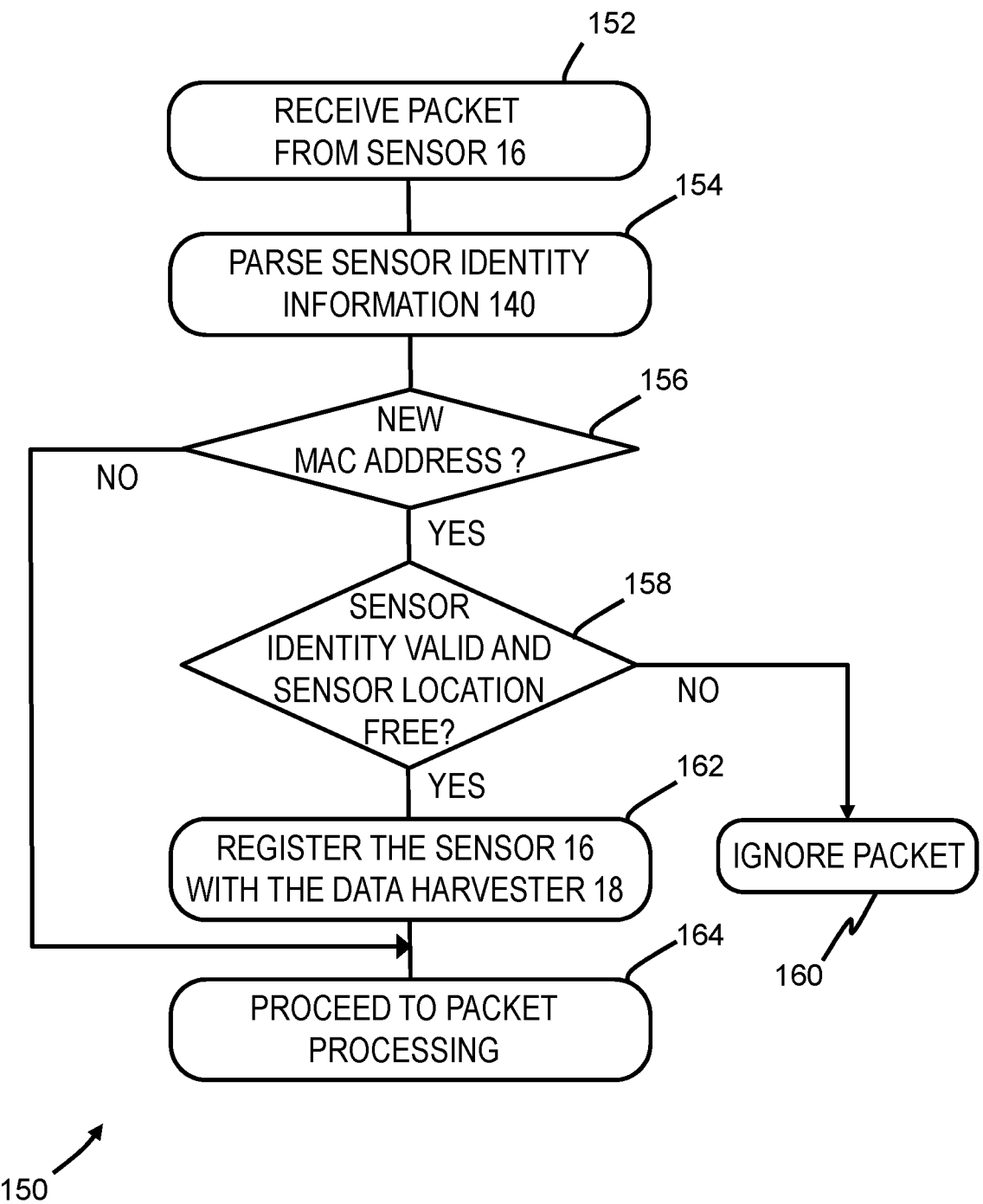
FIG. 8 is a flowchart illustrating steps performed by the data harvester to register one of the sensors in the sensing system of FIG. 1.

If it has not already done so, each data harvester 18a,b implements a data harvester configuration process (see flowchart 150 in FIG. 8). Each data harvester 18a,b then responds to this command by transmitting the sensor registration (provisional template) information to the data harvester client application 26, together with received signal strength indicator (RSSI) information for each sensor 16. For each detected sensor 16, this registration information includes (i) the serial number of the equipment 12 on which that sensor 16 is mounted (for example, pump serial number 44), and (ii) the intelligent mounting point 14 location (e.g. location description field 50) of each sensor 16.

The data harvester client application 26 receives this transmitted information from each data harvester 18a,b (step 184) and passes it to the IoT application 25.

The IoT application 25 selects the first (or next) sensor information from the provisional templates provided by the data harvesters 18a,b (step 186).

The IoT application 25 then compares the selected sensor information with the installation list (the Equipment Whitelist) to identify if that sensor 16 is associated with an equipment serial number and location matching the equipment serial numbers and locations received from the remote cloud computing environment 24 (step 188). In other words, the IoT application 25 checks if a sensor 16 registered with a data harvester 18a,b is on the Equipment Whitelist.

If a sensor 16 is associated with an equipment serial number (or location description) that is not on the installation list then it is ignored (step 190) and the data harvester client application 26 notifies the relevant data harvester 18a,b accordingly. This notification may comprise an immediate message sent to that data harvester 18a,b, or it may take the form of that sensor being omitted from a finalised template of authorised sensors being prepared for each data harvester 18a,b.

If a sensor 16 is associated with an equipment serial number and location description field 50 that is on the installation list then the data harvester client application 26 ascertains if more than one data harvester 18a,b has detected that sensor (step 192). This could occur because a sensor transmission may be detected by more than one data harvester 18 (for example, by data harvester 18a and data harvester 18b).

If one sensor 16 is detected by more than one data harvester 18a,b, then the client application 26 compares the RSSI measured by each of the data harvesters 18 that detected that sensor 16, and registers the sensor 16 with the data harvester 18 measuring the highest RSSI for that sensor 16 (step 194). The highest RSSI indicates which data harvester 18a,b receives the strongest signal from that sensor 16. It is possible, particularly on large equipment 12, that one sensor is registered with a first data harvester 18a and another sensor on the same equipment is registered with a different data harvester 18b.

If only one data harvester (e.g. data harvester 18a) detects a sensor 16 associated with that equipment serial number, then the data harvester client application 26 registers the sensor 16 with that data harvester 18a (step 196).

The IoT application 25 then ascertains if all of the sensors 16 from the provisional templates have been processed (registered or ignored) (step 198).

If some sensors 16 are still to be processed then the IoT application 25 reverts to step 186 where the next sensor is processed. The steps 188 to 198 are then repeated for the next sensor 16 until all of the approved sensors (those listed in the installation information) have been registered.

If all sensors 16 have been processed then the IoT application 25 creates a finalised template for each data harvester 18a,b in the system 10, and issues the relevant finalised template to each data harvester 18a,b. In this embodiment, there are two data harvesters 18a,b so two finalised templates are created, each data harvester 18a,b receiving its own unique finalised template.

The finalised template for each data harvester 18a,b lists only those sensors 16 that are allowed to be coupled to that data harvester 18a,b (i.e. that have been assigned to that data harvester 18). The data harvester 18a,b updates its provisional template with this finalised template. This may involve de-registering any sensors 16 that were provisionally registered but do not appear on the finalised template for that data harvester 18.

The data harvester 18 may monitor a significant number of sensors 16, for example, more than twenty sensors 16.

The data harvester 18 relays (transmits) measurement information to the ruggedized computer 20 in response to a request therefrom or at pre-set time intervals.

Each data harvester 18 can also send commands to its registered sensors 16, for example to update firmware thereon, or to switch the sensors 16 to the second (high data capture and transmission) mode, or to switch the sensors 16 to the first (low data capture and transmission) mode (which may be the default mode), or to switch the sensors 16 to a third mode (such as a sleep mode having reduced (or no) measurement collection and power usage for use during maintenance of the equipment 12).

In this example, the data harvesters 18 use the sensors 16a,b to monitor the pump bearing health, which includes measuring the temperature and vibrations of the bearings. An elevated temperature may indicate increased friction in the bearings, which may be a potential failure mode. Similarly, increased vibrations in the bearings may also indicate a potential failure mode.

Other sensors may include pressure sensing nodes to detect hydraulic abnormalities, which may indicate cavitation; flow rate sensing nodes to detect changes in flow rates; fluid detection sensing nodes to detect fluid leakage, which may indicate a failure of a seal, such as a gland seal or mechanical seal. Other measurements may relate to liner sear status (for example for hoses or spools), discharge hose wear status, volute wear status, wet end bearing health, dry end bearing health, pump speed, pump run hours of operation, pump utilisation, and the like. For cyclones other measurements may relate to cyclone operating status, splash status, semi-roping status, roping status, operating hours, number of cyclones in a cluster currently operating, and the like.

The data harvester 18 is optimised to receive and transmit sensor information and to provide some local storage of such information to allow local retrieval of such information. This is advantageous where internet access is expensive, intermittent, or difficult to obtain due to security constraints.

The ruggedized computer 20 can send commands to the data harvesters 18 to instruct one or more sensors 16 to change their operating mode, or to update capture parameters stored in such sensors 16.

The ruggedized computer 20 can also merge data from the distributed control system 22 with data received from the sensors 16 via the data harvesters 18. The ruggedized computer 20 may operate on this merged data (for example performing spectral analysis or deep learning) or transmit the merged data to the cloud computing environment 24 for further processing or analysis.

Where an operator desires to update the system configuration, they can select a reconfigure option on the mobile device app 28. This instructs the client interface 106 to stop sending the heartbeat signal. When the data harvester client 26 fails to detect the heartbeat it initiates the system configuration process 180.

If an operator desires to identify all operational sensors 16 installed and configured at that site, they can use the mobile device app 26 to request an 'all sensors' status list. This is relayed to the IoT application 25, which responds to that data harvester 18 with the list of sensors configured on the system and the status of each. This is transmitted from the data harvester 18 to the mobile device app 28. In this manner, an operator can obtain a list of the status of all sensors 16 on the site from one data harvester 18.

In other embodiments, instead of a MAC address being used to identify each sensor uniquely, the serial number of the equipment to which a sensor is connected and the sensor location (intelligent mounting point location) may be used as a unique identification for registration or comparison with the register of installed sensors.

In the above embodiment, the IoT application 25 included a data harvester client 26 illustrated as separate code by an ellipse, but this client 26 may not be separately executing code, it may be part of the IoT application 25 code in any format (e.g. monolithic code, interacting code objects, and the like).

In the foregoing description of certain embodiments, specific terminology has been used for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms, nor to imply a required orientation of the sensing system 10 or parts thereof.

In this specification, the word "comprising" (and its cognate equivalents) is to be understood in its "open" sense, that is, in the sense of "including", and thus not limited to its "closed" sense, that is the sense of "consisting only of".

The preceding description is provided in relation to several embodiments which may share common characteristics and features. It is to be understood that one or more features of any one embodiment may be combined with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope of the disclosed embodiments, the embodiments being illustrative and not restrictive. For example, the equipment may be a pump other than a centrifugal pump, or a hydrocyclone, a vibrating screen, a valve, or the like.

The various embodiments described above may be implemented in conjunction with other embodiments, e.g., aspects of one embodiment may be combined with aspects of another embodiment to realise yet other embodiments.

LIST OF REFERENCE NUMERALS

Sensing system 10
Equipment 12
Intelligent mounting points 14a,b
Sensors 16a,b
Data harvester 18a,b
Ruggedized computer 20
Distributed control system (DCS) 22
Remote cloud computing environment 24
Internet of Things (IoT) application 25
Data harvester client 26
Mobile device 27
Mobile device sensor system app 28
Server component 29
Mounting point memory 30
Bluetooth Low Energy (BLE) transceiver 31
Header category 32
Equipment identification category 34
Sensing point category 36
Header type information 42
Pump serial number field 44
Pump part number 46
Descriptive name field 48
Location description field 50
Sensing mode field 52
Reporting period field 54
Capture parameters field 56
Processing operations field 58
Housing 60
Coupling zone 62
Flat (upper) surface 64
Network adapter information (MAC address) 66
Orientation information 68
Sensor circuit board 70
Sensor power source 72
Sensor wireless (BLE) transceiver 74
Sensor nodes 76
Sensor controller 78
Sensor microprocessor 80
Sensor microprocessor memory 82
Data harvester circuit board 90
Data harvester power source 92
Data harvester wireless (BLE) transceiver 94
Data harvester wired (Ethernet transceiver) network connection 96
Data harvester controller 98
Data harvester microprocessor 100
Data harvester memory 102
Sensor transceiver API 104
Client interface 106
Data harvester firmware 108
Ethernet connector port 110
Information packet 136
Sensor identity information 138
Equipment identity information 140
Measurement information 142

The invention claimed is:

1. A sensing system for sensing operational parameters of a single item of minerals processing equipment, the sensing system comprising:
   (i) a plurality of intelligent mounting points distributed around the single item of equipment, each intelligent mounting point:
      (a) being located at a position on the single item of equipment at which a measurement is to be recorded,
      (b) defining a mounting zone into which a sensor may be coupled, and
      (c) including a programmable memory storing at least one equipment identification parameter and at least one sensing point parameter, each of which can be electronically transmitted from the programmable memory;
   (ii) a plurality of programmable sensors, each sensor being operable in a plurality of operating modes, and at least one of the programmable sensors comprising:
      (a) a coupling zone operable to be mounted on the mounting zone of each of the intelligent mounting points,
      (b) a memory for storing data captured by the sensor,
      (c) a wireless transceiver,
      (d) a processor operable to control the operation of that programmable sensor by (i) configuring the programmable sensor for specific measurements that are suited to that part of the equipment at which the intelligent mounting point is located based on the parameters received from the intelligent mounting point programmable memory and (ii) receiving information from the programmable sensor corresponding to those specific measurements, thereby enabling programmable sensors to be configured at the time they are coupled to the equipment and allowing a programmable sensor to be removed and used at a different intelligent mounting point at another location where it can be configured to take different measurements; and
   (iii) a data harvester comprising
      (a) a wireless transceiver for communicating with the plurality of sensors and a portable device,
      (b) a network connection for communicating with a local computer,
      (c) a memory for storing data captured by the sensors, and
      (d) a controller operable to control the operation of the data harvester, and being programmable to switch the programmable sensors between operating modes.

2. The sensing system of claim 1, further comprising the local computer, where the local computer is coupled to a distributed control system, and is operable to merge data from the distributed control system with data received from the sensors via the data harvester, and to transmit the merged data to a cloud computing environment for further processing.

3. The sensing system of claim 1, wherein each sensor is operable in a plurality of modes, including a first mode in which a low data rate of information is transmitted and a second mode in which a high data rate of information is transmitted.

4. The sensing system of claim 1, wherein the at least one equipment identification parameter comprises one or more of: (i) a serial number of the equipment, (ii) a part number of the equipment, and (iii) a descriptive name for the equipment.

5. The sensing system of claim 1, wherein the at least one sensing point parameter comprises one or more of: (i) an identification of the part of the equipment at which a measurement is being recorded, (ii) an indication of a sensing mode to be used by a corresponding sensor mounted thereto, (iii) an indication of a reporting period, (iv) an indication of capture parameters to be used, and (v) an indication of a processing operation to be performed on raw data prior to the sensor transmitting the processed data to the data harvester.

6. The sensing system of claim 5, wherein the identification of the part of the equipment at which a measurement is being recorded is unique for each mounting point on the equipment.

7. The sensing system of claim 1, wherein the wireless transceiver comprises a Bluetooth low energy wireless transceiver.

8. The sensing system of claim 3, wherein the data harvester is programmable to switch a sensor from the first mode to the second mode for a defined time, then to switch the sensor back to the first mode.

9. Mineral processing equipment including a sensing system according to claim 1.

10. The sensing system of claim 1, wherein each intelligent mounting point includes a mounting point memory for storing the equipment identification and the sensing point parameters.

11. The sensing system of claim 1, wherein each programmable sensor is operable in at least three operating modes, one of which is a sleep mode in which the sensor consumes little or no power and makes a few or no measurements.

12. The sensing system of claims 11, wherein at least two of the programmable senor operation modes involve the programmable sensors capturing data.

13. A method of sensing operational parameters of a single item of minerals processing equipment, the method comprising:
   providing a plurality of intelligent mounting points distributed around the single item of equipment, each intelligent mounting point being located at a position on the single item of equipment at which a measurement is to be recorded and including a programmable memory storing at least one equipment identification parameter and at least one sensing point parameter, each of which can be electronically transmitted from the programmable memory;
   providing a plurality of programmable sensors, each sensor being operable in a plurality of operating modes and being coupled to a respective intelligent mounting point;
   providing a processor operable to control the operation of the programmable sensors;
   transmitting the at least one equipment identification parameter and the at least one sensing point parameter from each intelligent mounting point to each respective programmable sensor;
   configuring each programmable sensor with operational parameters based on the transmitted sensing point parameters thereby enabling the programmable sensors to be configured at the time they are coupled to the equipment and allowing a programmable sensor to be removed and used at a different intelligent mounting point at another location on the equipment where it can be configured with different operational parameters to take different measurements;

switching the sensor temporarily from a first mode of operation with a low data transmission rate to a second mode of operation with a high data transmission rate, based on a signal received wirelessly from a data harvester; and wirelessly transmitting captured sensor data to the data harvester.

14. The method of claim 13, further comprising transmitting the captured sensor data from the data harvester to a local computer using a wired connection.

15. The method of claim 13, further comprising merging, at the local computer, data received from a distributed control system with the captured data, and transmitting the merged data to a remote networked computer for further processing and analysis.

* * * * *